United States Patent
Lee

(10) Patent No.: US 7,874,746 B2
(45) Date of Patent: Jan. 25, 2011

(54) CAMERA MODULE AND MOBILE TERMINAL HAVING THE SAME

(75) Inventor: Jin Ho Lee, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 300 days.

(21) Appl. No.: 11/747,011

(22) Filed: May 10, 2007

(65) Prior Publication Data

US 2007/0264002 A1    Nov. 15, 2007

(30) Foreign Application Priority Data

May 11, 2006    (KR)    ...................... 10-2006-0042496

(51) Int. Cl.
*G03B 17/00*    (2006.01)
(52) U.S. Cl. .................. 396/529; 348/342; 359/819
(58) Field of Classification Search ................ 396/529; 348/342; 359/819
See application file for complete search history.

(56) References Cited

U.S. PATENT DOCUMENTS 6,898,030 B1 * 5/2005 Lin et al. .................... 359/819

| | | | |
|---|---|---|---|
| 2002/0154239 A1* | 10/2002 | Fujimoto et al. | 348/340 |
| 2004/0061799 A1* | 4/2004 | Atarashi et al. | 348/340 |
| 2005/0237415 A1* | 10/2005 | Kong et al. | 348/335 |
| 2005/0285016 A1* | 12/2005 | Kong et al. | 250/208.1 |
| 2006/0028573 A1* | 2/2006 | Seo et al. | 348/340 |
| 2006/0126194 A1* | 6/2006 | Kazama | 359/811 |
| 2006/0228103 A1* | 10/2006 | Go | 396/268 |
| 2006/0290802 A1* | 12/2006 | Webster et al. | 348/340 |

* cited by examiner

*Primary Examiner*—W. B. Perkey
*Assistant Examiner*—Fang-Chi Chang
(74) *Attorney, Agent, or Firm*—Saliwanchik, Lloyd & Saliwanchik

(57) ABSTRACT

Disclosed are a camera module and a mobile terminal having the same, capable of simplifying the manufacturing process while reducing the fault rate and improving reliability of products. The camera module can include a camera housing having a support protrusion with an aperture formed at a center thereof and a predetermined mounting section provided at an inner portion; a plurality of lenses inserted and mounted in the mounting section of the camera housing so as to receive an optical image of a subject, where the support protrusion is provided at an upper portion of the lenses; an IR cut-off filter disposed below the lenses while sealing the mounting section; an image sensor; and a printed circuit board that digitalizes an image signal output from the image sensor.

9 Claims, 4 Drawing Sheets

CAMERA MODULE AND MOBILE TERMINAL HAVING THE SAME

CROSS-REFERENCE TO RELATED APPLICATION

The present application claims the benefit under 35 U.S.C. §119 to Korean Patent Application No. 10-2006-0042496, filed May 11, 2006, which is hereby incorporated by reference in its entirety.

BACKGROUND

The present document relates to a camera module.

A camera module is a device for photographing an image. The camera module may be provided in a mobile terminal in order to diversify applications of the mobile terminal. Here, the mobile terminal includes not only mobile phones, but also various wireless communication devices.

A camera module in the related art includes a lens unit, a lens holder, a housing, an IR cut-off filter, an image sensor and a printed circuit board. The lens unit receives an optical image of a subject and then transfers the optical image to the IR cut-off filter. Upon receiving the optical image, the IR cut-off filter cuts off infrared ray from the optical image and then transfers the optical image to the image sensor. The image sensor converts the optical image into an electric signal to output the electric signal. The printed circuit board is formed with predetermined electric patterns and a plurality of electrodes. The printed circuit board digitalizes the image signal output from the image sensor.

Focusing is performed by adjusting the distance between the lens unit and the image sensor to provide the clear image. The lens unit is coupled with the lens holder. Female/male screws are formed at coupling portions of the lens holder and the housing, respectively, so that the lens holder can be screw-coupled with the housing. That is, the focusing is performed by adjusting the distance between the lens unit and the image sensor using the screw mechanism.

According to a camera module in the related art using the screw mechanism, a worker sets the focal distance by rotatably coupling the lens holder with the housing using predetermined equipment. Therefore, if the torque value between the screw sections of the lens holder and the housing is out of a predetermined reference value, following problems may occur.

That is, if the torque value is less than the reference value, the lens holder cannot be securely coupled with the housing. In this case, the lens holder is randomly rotated when coupling the lens holder to the housing, causing the defocus phenomenon.

In addition, if the torque value is higher than the reference value, the focal distance can be precisely adjusted by rotating the lens holder. However, impurities are produced due to friction between the screw sections of the lens holder and the housing. Such impurities may degrade the image quality.

BRIEF SUMMARY

Embodiments of the present invention provide camera modules.

Embodiments of the present invention provide camera modules and mobile terminals equipped with the same, capable of simplifying the manufacturing processes and improving the image quality.

An embodiment of the present invention provides a camera module. The camera module can include a camera housing having a support protrusion with a perforation hole formed at a center thereof and a predetermined mounting section provided at an inner portion of the camera housing; a plurality of lenses inserted and mounted in the mounting section of the camera housing so as to receive an optical image of a subject, wherein the support protrusion of the housing is provided at an upper portion of the lenses so as to fixedly support the lenses; an IR cut-off filter disposed below the lenses while sealing the mounting section; an image sensor; and a printed circuit board that digitalizes an image signal outputted from the image sensor.

An embodiment of the present invention provides a mobile terminal. The mobile terminal can include a camera module, a communication device for making communication with external devices, and a controller for controlling the communication device and the camera module. The camera module can include a camera housing having a support protrusion with a perforation hole formed at a center thereof and a predetermined mounting section provided at an inner portion of the camera housing; a plurality of lenses inserted and mounted in the mounting section of the camera housing so as to receive an optical image of a subject, wherein the support protrusion of the housing is provided at an upper portion of the lenses so as to fixedly support the lenses; an IR cut-off filter disposed below the lenses while sealing the mounting section; an image sensor; and a printed circuit board that digitalizes an image signal outputted from the image sensor.

An embodiment of the present invention provides a camera module. The camera module can include a camera housing having an aperture at an outer surface and a predetermined mounting section provided at an inner portion, a plurality of lenses inserted and mounted in the mounting section of the camera housing so as to receive an optical image of a subject through the aperture of the camera housing, an IR cut-off filter disposed at an upper portion of the lenses, a support protrusion provided at a lower portion of the mounting section of the camera housing so as to fixedly support the lenses, an image sensor, and a printed circuit board that digitalizes an image signal output from the image sensor.

An embodiment of the present invention provides a mobile terminal. The mobile terminal can include a camera module, a communication device for making communication with external devices, and a controller for controlling the communication device and the camera module. The camera module can include a camera housing having an aperture at an outer surface and a predetermined mounting section provided at an inner portion, a plurality of lenses inserted and mounted in the mounting section of the camera housing so as to receive an optical image of a subject through the aperture of the camera housing, an IR cut-off filter disposed at an upper portion of the lenses, a support protrusion provided at a lower portion of the mounting section of the camera housing so as to fixedly support the lenses, an image sensor, and a printed circuit board that digitalizes an image signal output from the image sensor.

DETAILED DESCRIPTION

Hereinafter, the present invention will be described with reference to accompanying drawings.

Figure 1:
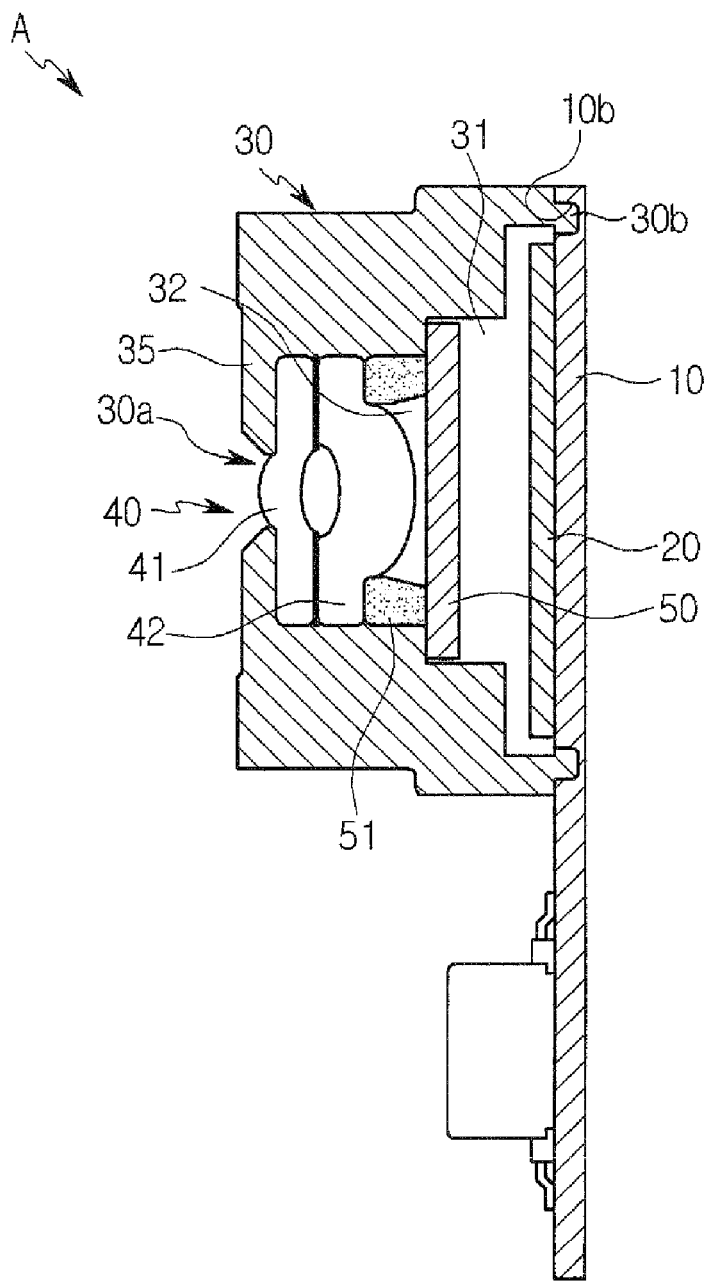
FIG. 1 is a cross-sectional view showing the coupling structure of a camera module according to an embodiment of the present invention.

FIG. 1 is a cross-sectional view showing a coupling structure of a camera module according to an embodiment of the present invention.

As shown in FIG. 1, the camera module A according to an embodiment of the present invention includes a printed circuit board 10, an image sensor 20, and a camera housing 30. A plurality of lenses 40 and an IR cut-off filter 50 are disposed in the camera housing 30.

Predetermined electric patterns and a plurality of electrodes can be formed on the printed circuit board 10. The printed circuit board 10 digitalizes the image signal output from the image sensor 20. The image sensor 20, which converts the image signal into an electric signal, can be attached between the electrodes by means of adhesive, such as epoxy, etc. In addition, coupling holes 10b can be formed outwardly of the electrodes along outer peripheral portions of the printed circuit board 10, so that the camera housing 30 can be coupled with the printed circuit board 10.

The image sensor 20 can include a pixel area having a plurality of pixels and a plurality of electrodes that serve as input/output terminals of the pixel area. The electrodes provided in the image sensor 20 can be electrically connected to the electrodes of the printed circuit board 10 through wire bonding.

The camera housing 30 can be a cylindrical plastic molding member. The camera housing 30 can be provided therein with a mounting section 31 for mounting the lenses 40 and a resting section 32 for resting the IR cut-off filter 50 therein.

A perforation hole 30a can be formed at the outer center portion of the camera housing 30 so as to allow the lenses 40 to be exposed to the exterior. Thus, the image can be obtained from the exterior by means of the lenses 40. In addition, a coupling protrusion 30b can be provided at an outer end potion of the camera housing 30. The coupling protrusion 30b can be inserted into the coupling hole 10b formed in the printed circuit board 10.

In a state in which the coupling protrusion 30b is inserted into the coupling hole 10b, the coupling protrusion 30b can be fixedly bonded to the printed circuit board 10 by means of adhesive, such as epoxy, etc. Thus, the camera housing 30 is sealed from the exterior.

The lenses 40 converge or diverge light to form the optical image. The lenses 40 may include a first lens 41 and a second lens 42. The first and second lenses 41 and 42 may include aspheric lenses. In addition, the first lens 41 can be prepared as a convex lens and the second lens 42 can be prepared as a concave lens. Air may exist in a region between the first and second lenses 41 and 42, or other medium can be provided in the region. The lenses 40 can be inserted and mounted into the mounting section 31 formed in the camera housing 30.

The camera housing 30 can be designed such that the distance between the lenses 40 and the image sensor 20 may correspond to the total track of lens of the optical system. Thus, according to an embodiment of the present invention, it is not necessary to additionally adjust the focal distance between the lenses 40 and the image sensor 20. The total track of lens signifies the distance between the lens center, onto which light is firstly incident, and the image sensor, that is, the distance when the focus is completed.

Meanwhile, the IR cut-off filter 50 can be attached to the resting section 32 formed in the camera housing 30 by means of adhesive. Accordingly, the lenses 40 can be fixedly installed in the resting section 31, and the resting section 31 is sealed by means of the IR cut-off filter 50.

In general, different from the eyes of human, the image sensor 20, which can be a charge coupled device, can detect wavelength bands of near infrared ray and infrared ray. For this reason, the color of an image photographed by the image sensor 20 is closed to red. In order to solve this problem, the IR cut-off filter 50 is installed between the lenses 40 and the image sensor 20. Thus, the image received through the lenses 40 is focused on the image sensor 20 after the infrared ray has been removed from the image by means of the IR cut-off filter 50.

A spacer 51 can be provided at one surface of the IR cut-off filter 50 in order to support the lenses 40. That is, the lenses 40 are supported by the spacer 51 in such a manner that the lenses 40 can fixedly adhere to the IR cut-off filter 50. Due to the spacer 51 inserted into the mounting section 31 and the IR cut-off filter 50, the mounting section 31 can be stably sealed.

Figure 3:
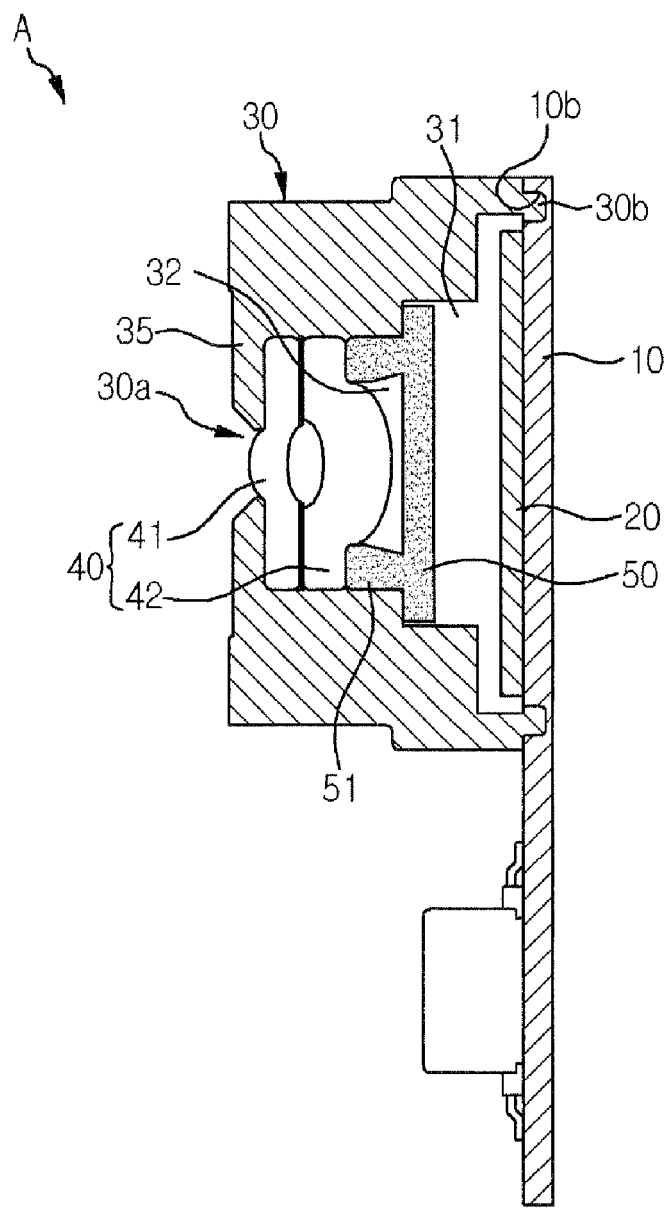
FIG. 3 is a cross-sectional view of a camera module according to an embodiment of the present invention.
Figure 4:
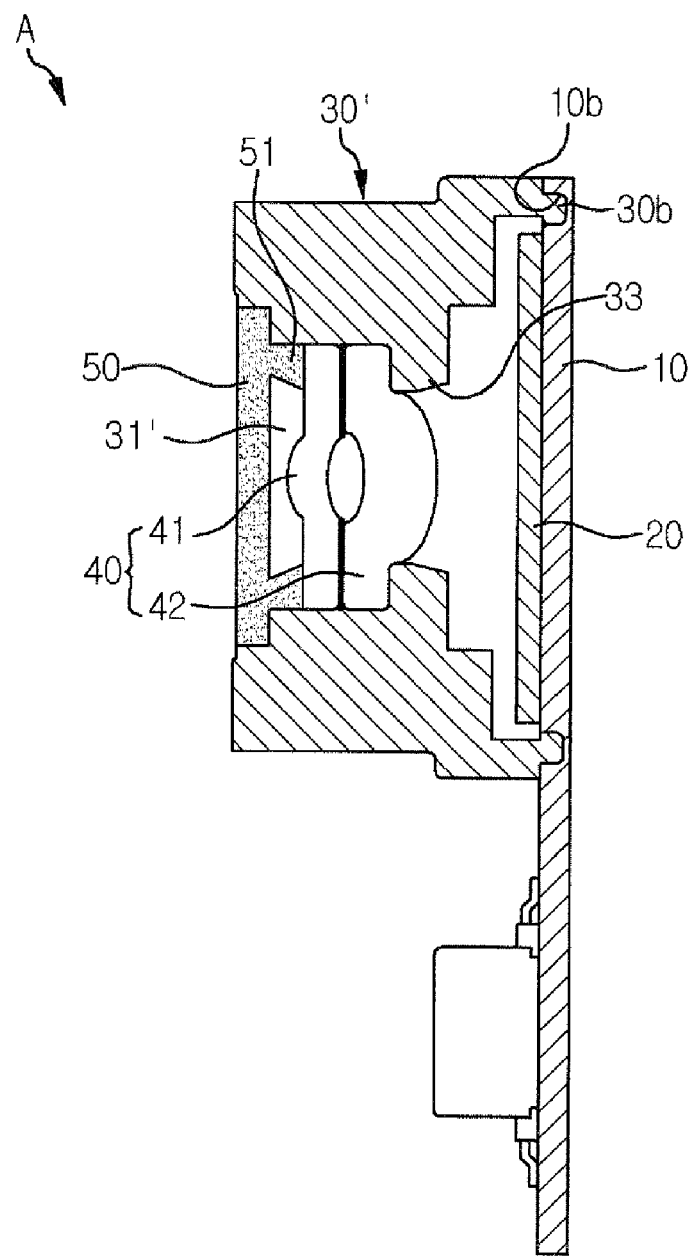
FIG. 4 is a cross-sectional view of a camera module according to an embodiment of the present invention.

The spacer 51 can be fabricated separately from the IR cut-off filter 50, or can be integrally formed with the IR cut-off filter 50 (FIGS. 3 and 4 show the spacer 51 integrally formed with the IR cut-off filter 50). If the spacer 51 is fabricated separately from the IR cut-off filter 50, the spacer 51 fixedly makes contact with the IR cut-off filter 50. In addition, the spacer 51 can be arranged to fixedly support the lenses 40.

Further, a support protrusion 35 can be provided at an upper portion of the lenses 40. The support protrusion 35 can be integrally formed with the camera housing 30. In one embodiment, the support protrusion 35 can be fabricated separately from the camera housing 30.

According to an embodiment of the present invention, the lenses 40 and the IR cut-off filter 50 can be integrally formed in the camera housing 30 while realizing the stable sealing structure. Accordingly, the lenses 40 can be installed as the camera housing 30 is assembled with the printed circuit board 10.

Figure 2:
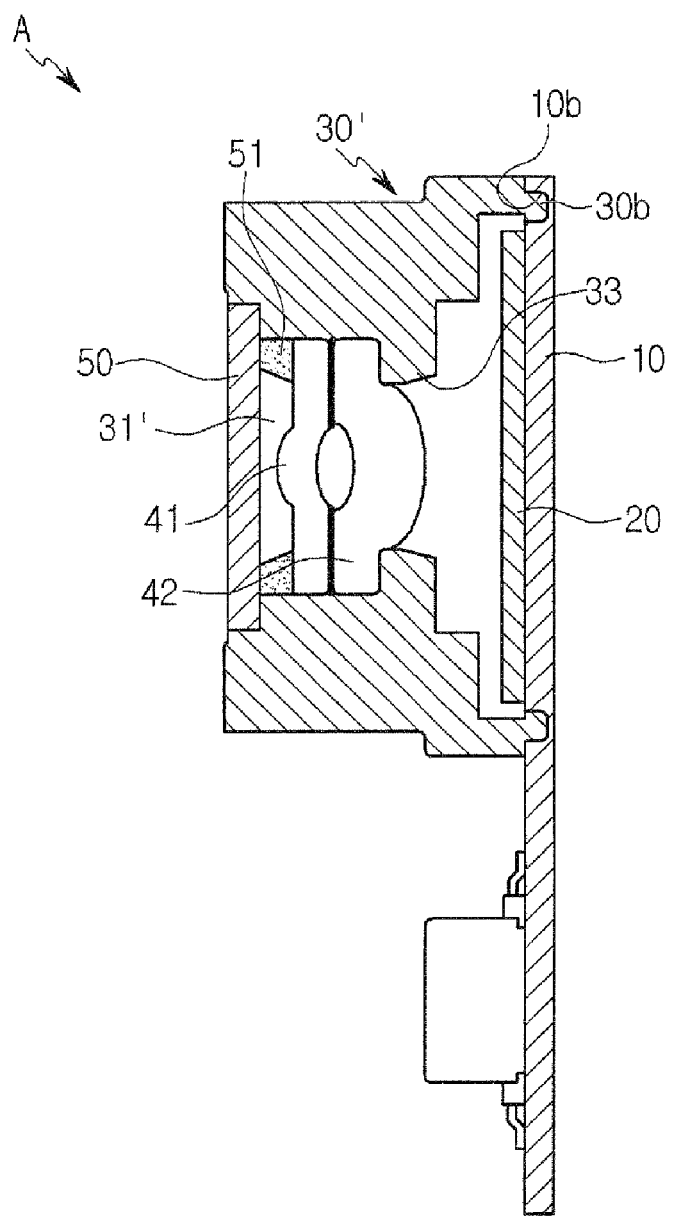
FIG. 2 is a cross-sectional view showing the coupling structure of a camera module according to another embodiment of the present invention.

FIG. 2 is a sectional view showing a coupling structure of a camera module according to another embodiment of the present invention. Hereinafter, an embodiment of the present invention will be described while focusing on the difference relative to the embodiment described with reference to FIG. 1.

According to the embodiment shown in FIG. 2, the IR cut-off filter 50 is positioned at front portions of first and second lenses 41 and 42. In this case, an outer portion of a camera housing 30' is expanded so as to install the IR cut-off filter 50 therein. In addition, different from the embodiment described with reference to FIG. 1, the spacer 51 supports an outer portion of the first lens 41.

According to this structure, the spacer 51 adjacent to the IR cut-off filter 50 supports the first lens 41 instead of the second lens 42. An additional support protrusion 33 can be provided at an end portion of a mounting section 31' so as to support an outer portion of the second lens 42. Thus, the first and second lenses 41 and 42 and the IR cut-off filter 50 can be stably and fixedly positioned in the camera housing 30'.

The camera housing 30' can be designed in such a manner that the distance between the lenses 41 and 42 and the image sensor 20 may correspond to the total track of lens of the optical system. Thus, according to the present embodiment, it is not necessary to additionally adjust the focal distance between the lenses 41 and 42 and the image sensor 20.

The above-described embodiments show the IR cut-off filter installed separately from the lenses. However, the IR cut-off filter can be integrally formed with the lenses by coating the IR cut-off filter on the surface of the lenses.

Different from the camera module of the related art, the camera module according to embodiments of the present invention does not require the assembling process for the lens holder, so impurities derived from mechanical friction between screw sections can be prevented from being produced. Accordingly, image degradation caused by the impurities can be minimized. In addition, the inability to work and focus distortion caused by the fault in the torque value can be inhibited. Further, since the camera module can be assembled matching with the predetermined optical distance, it is not necessary to additionally adjust the focal distance. Furthermore, the number of parts used for the camera module can be reduced, so that the manufacturing cost can be reduced.

The camera module according to the embodiments of the present invention is applicable for various mobile terminals. Here, the mobile terminals can include mobile phones as well as various wireless communication devices.

Such a mobile terminal includes a mobile communication terminal equipped with a camera module, a digital camera, or a complex terminal equipped with a camera module. In general, a communication device is separately provided in the mobile terminal so as to allow the user to make voice-communication with other users. In addition, the user can transmit the image obtained by using the camera module to other users through the communication device. Here, the mobile terminal may further include a controller for controlling the operation of the communication device and the camera module.

The camera module and the mobile terminal having the same according to the embodiments of the present invention can simplify the manufacturing process and improve the image quality.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a camera housing including an aperture at an outer surface and a predetermined mounting section provided at an inner portion;
   a plurality of lenses inserted and mounted in the mounting section of the camera housing so as to receive an optical image of a subject through the aperture of the camera housing;
   an IR cut-off filter disposed at an upper portion of the lenses;
   a support protrusion provided at a lower portion of the mounting section of the camera housing so as to support the lenses;
   an image sensor that receives the optical image through the IR cut-off filter and the lenses; and
   a printed circuit board coupled to the image sensor;
   wherein the IR cut-off filter comprises a spacer protruding from the IR cut-off filter,
   wherein the spacer is in direct contact with at least one lens of the plurality offenses such that the spacer supports the at least one lens,
   wherein a maximum distance between side surfaces of the IR cut-off filter is greater than a maximum distance between side surfaces of the spacer, and
   wherein a portion of the lens supported by spacer is disposed on a same horizontal plane with the spacer.

2. The camera module according to claim 1, wherein the support protrusion is fabricated separately from the camera housing and coupled to the lower portion of the mounting section of the camera housing.

3. The camera module according to claim 1, wherein the support protrusion us integrally formed with the camera housing.

4. The camera module according to claim 1, wherein the camera housing further includes a coupling protrusion provided at a peripheral end portion of the camera housing, and wherein the coupling protrusion is inserted and mounted into a coupling hole formed in the printed circuit board to couple the camera housing to the printed circuit board.

5. The camera module according to claim 1, wherein each lens of the plurality of lenses is in direct contact with each other lens of the plurality of lenses.

6. The camera module according to claim 1, wherein the IR cut-off filter, the plurality of lenses, and the support protrusion are directly contacted with one another.

7. A mobile terminal comprising:
   a camera module comprising:
      a camera housing including an aperture at an outer surface and a predetermined mounting section at an inner portion,
      a plurality of lenses inserted and mounted in the mounting section of the camera housing so as to receive an optical image of a subject through the aperture of the camera housing,
      an IR cut-off filter disposed at an upper portion of the lenses, wherein the IR cut-off filter includes a spacer protruding from the IR cut-off filter, wherein the spacer is in direct contact with at least one lens of the plurality of lenses such that the spacer supports the at least one lens, wherein a maximum distance between side surfaces of the IR cut-off filter is greater than a maximum distance between side surfaces of the spacer, and wherein a portion of the lens supported by the spacer is disposed on a same horizontal plane with the spacer,
      a support protrusion provided a lower portion of the mounting section of the camera housing so as to support the lenses, an image sensor that receives an optical image through the IR cut-off filter and the lenses, and a printed circuit board coupled to the image sensor;

a communication device for making communication with external devices; and a controller for controlling the communication device and the camera module.

8. The mobile terminal according to claim 7, wherein each lens of the plurality of lenses is in direct contact with each other lens of the plurality of lenses.

9. The mobile terminal according to claim 7, wherein the IR cut-off filter, the plurality of lenses, and the support protrusion are directly contacted with one another.

* * * * *